(12) United States Patent
Hayakawa

(10) Patent No.: US 6,973,316 B1
(45) Date of Patent: Dec. 6, 2005

(54) POSITION DETECTING METHOD AND APPARATUS

(75) Inventor: Tadashi Hayakawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1176 days.

(21) Appl. No.: 09/645,334

(22) Filed: Aug. 25, 2000

(30) Foreign Application Priority Data

Aug. 30, 1999 (JP) .................................. 11-243169

(51) Int. Cl.[7] .............................................. H04Q 7/20
(52) U.S. Cl. ................................... 455/456.1; 342/127
(58) Field of Search .......................... 455/67.11, 67.16, 455/91, 95–99, 110–111, 115.1, 115.2, 456.1, 455/456.5, 456.6; 342/127; 375/130

(56) References Cited

U.S. PATENT DOCUMENTS

| | | | |
|---|---|---|---|
| 3,412,399 A | | 11/1968 | Chisholm |
| 3,797,015 A | * | 3/1974 | Elwood ....................... 342/458 |
| 3,988,734 A | * | 10/1976 | Elwood ....................... 342/464 |
| 4,357,609 A | | 11/1982 | Spencer |
| 5,017,926 A | * | 5/1991 | Ames et al. ................. 342/353 |
| 5,099,245 A | * | 3/1992 | Sagey ................... 342/357.01 |
| 5,274,667 A | | 12/1993 | Olmstead |
| 5,321,721 A | | 6/1994 | Yamaura et al. |
| 5,504,776 A | | 4/1996 | Yamaura et al. |
| 5,508,708 A | | 4/1996 | Ghosh et al. |
| 5,515,056 A | * | 5/1996 | Henderson et al. ......... 342/125 |
| 5,736,964 A | | 4/1998 | Ghosh et al. |
| 5,875,402 A | | 2/1999 | Yamawaki |
| 6,373,434 B1 | * | 4/2002 | Hayakawa ................... 342/387 |
| 6,738,412 B1 | * | 5/2004 | Hayakawa ................... 375/130 |
| 6,820,031 B1 | * | 11/2004 | Hayakawa ................... 702/158 |

FOREIGN PATENT DOCUMENTS

| | | | |
|---|---|---|---|
| EP | 0865223 | 9/1996 | |
| EP | 1081503 A2 | * 3/2001 | ............. G01S 5/14 |
| WO | 99/15911 | 4/1999 | |

OTHER PUBLICATIONS

English Language Abstract of JP 10-322752.

* cited by examiner

Primary Examiner—Roland G. Foster
(74) Attorney, Agent, or Firm—Greenblum & Bernstein, P.L.C.

(57) ABSTRACT

A sufficiently great processing gain is obtained by employing a sufficiently long symbol duration for a measuring signal, whereby it is possible to obtain both an increased communicable distance of the measuring signal and a reduced interference amount. Therefore it is possible to detect a position of a mobile station in a base station arrangement providing the efficient use of radio resource for the information communications in the cellular mobile communication.

7 Claims, 6 Drawing Sheets

POSITION DETECTING METHOD AND APPARATUS

BACKGROUND OF THE INVENTION

1. Field of the Invention

The present invention relates to a position detecting method and apparatus suitable for detecting a distance between mobile stations, or a mobile station and base station to specify a position of the mobile station, and more particularly to the position detecting method and apparatus suitable for a mobile communication system with a spread spectrum communication system.

2. Description of the Related Art

An example of a conventional method of detecting a position of a mobile station in a cellular mobile communication system is described in Unexamined Japanese Patent Publication HEI10-505723.

Relative distances between a mobile station and a plurality of base stations in the cellular mobile communication system are each obtained from a propagation time required for one way of a communication between the mobile station and a respective base station. Then based on a plurality of obtained distance information and position information of a plurality of base stations, a position of the mobile station is obtained with a principle of trigonometrical measurement.

However a conventional cellular mobile communication system has the following problem.

That is, when a service is newly started that detects a position of a mobile station in a cellular mobile communication system which already provides an information communication service, in order to obtain a distance between a mobile station and each of a plurality of base stations, a precondition is needed that the mobile station and each of the plurality of base stations are communicable. Therefore it is necessary for a communicable area, i.e., cell of a base station to cover another base station neighboring to the base station. However a cell covering another neighboring base station provides increased interference between the base stations, and thereby results in an improper base station arrangement in the cellular mobile communication system. In other words, a requirement for a base station arrangement to detect a position of a mobile station conflicts with another requirement for the base station arrangement to efficiently use radio resources in the information communication. Therefore it is difficult to efficiently perform both the information communication service and mobile station position detecting service in a current situation.

SUMMARY OF THE INVENTION

The present invention is carried out in view of the foregoing. It is an object of the present invention to provide a position detecting method and apparatus capable of detecting a position of a mobile station in a base station arrangement having a purpose of efficiently using radio resources for an information communication in a cellular mobile communication with a spread spectrum system.

A distance detecting method of the present invention provides a base station with a broadcast channel, where using the broadcast channel, the base station transmits a signal having a periodicity based on a reference timing generated by a reference timer provided in the base station, and a mobile station receives the signal having the periodicity, detects the received timing with another reference timer provided in the mobile station to obtain a phase difference, and based on the obtained phase difference, detects a distance between the mobile station and base station.

According to this method, when the timer matching is completed between the base station and mobile station, the distance between the base station and mobile station is obtained by multiplying the obtained phase difference by a velocity of light.

Further in the distance detecting method of the present invention, the mobile station and base station communicate signals, the mobile station receives a signal from the base station, and detects the received timing with the reference timer provided in the mobile station to obtain a phase difference, the base station receives a signal from the mobile station, detects the received timing with the reference timer provided in the base station to obtain a phase difference, and further detects a reference timing difference between the mobile station and base station based on the phase differences obtained in the base station and mobile station, and based on the detected reference timing difference, the reference timer of the mobile station is matched with the reference timer of the base station.

According to this method, it is possible to match the reference timer of the mobile station with the reference timer of the base station. In this case, the difference of the reference timer of the mobile station from that of the base station as a reference is obtained with the following equation.

Difference of the reference timer of the mobile station= (phase difference detected in the base station−phase difference detected in the mobile station)/2.

By the use of the distance detecting method described above, a position detecting method of the present invention detects respective distances between the mobile station and at least three base stations, and based on the detected distance, detects a position of the mobile station.

According to this method, it is possible to detect the respective distances between the mobile station and the at least three base stations, whereby using the principle of trigonometrical measurement, the position of the mobile station can be detected.

Further in the position detecting method of the present invention, a plurality of base stations communicating with the mobile station are considered to be a main base station with which the mobile station registers a position thereof, and at least two base stations neighboring to the main base station, and a distance between the mobile station and main base station is detected. Based on the detected distance, respective distances between the main base station and the at least two base stations neighboring to the main base station, and a value of a communication parameter of a measuring signal between the mobile station and main base station, initial values of communication parameters of respective measuring signals between the mobile station and the at least two base stations are determined.

According to this method, by substituting the distance between the mobile station and main base station with which the mobile station registers the position thereof, and respective distances between the main base station and the at least two base stations neighboring to the main base station into an attenuation function of radiated power with distance, it is possible to obtain conditions of the communication parameters enabling the mobile station and the at least two base stations neighboring to the main base station to mutually receive respective measuring signals.

By reflecting the conditions of communication parameters in the initial values of the respective communication parameters between the mobile station and the at least two base stations neighboring to the main base station, it is possible for the mobile station and the at least two base stations neighboring to the main base station to start communicating the respective measuring signals assuredly. Then it is possible to detect the respective distances between the mobile station, and the main base station and at least two base stations neighboring to the main base station, whereby using the principle of trigonometrical measurement, a position of the mobile station can be detected.

Furthermore in the position detecting method of the present invention, the initial values of transmit power and processing gains of the respective measuring signals to be transmitted from the at least two base stations neighboring to the main base station to the mobile station are determined based on the distance between the mobile station and main base station, respective distances between the main base station and the at least two base stations neighboring to the main base station, and the transmit power and processing gain of the measuring signal to be transmitted from the main base station.

According to this method, by substituting the distance between the mobile station and main base station, and respective distances between the main base station and the at least two base stations neighboring to the main base station into the attenuation function of radiated power with distance, it is possible to calculate actual transmit power of the respective measuring signals from the at least two base stations to the mobile station, by calculating respective magnifications to be multiplied by actual transmit power of the measuring signal from the base station to enable the mobile station to receive the respective measuring signals. By reflecting the above-mentioned conditions in the initial values of transmit power and processing gains, the mobile station can receive the respective measuring signals from at least two base stations neighboring to the main base station assuredly.

Still furthermore in the position detecting method of the present invention, the initial values of transmit power and processing gains of the respective measuring signals to be transmitted from the mobile station to the at least two base stations neighboring to the main base station are determined based on the distance between the mobile station and main base station, a maximum value in the respective distances between the main base station and the base stations neighboring to the main base station, and the transmit power and processing gain of the measuring signal transmitted from the mobile station to the main base station.

According to this method, by substituting the distance between the mobile station and main base station, and the maximum value in the respective distances between the main base station and the base stations neighboring to the main base station into the attenuation function of radiated power with distance, it is possible to calculate actual transmit power of the respective measuring signals from the mobile station to the at least two base stations neighboring to the main base station, by calculating respective magnifications to be multiplied by actual transmit power of the measuring signal to the main base station to enable the at least two base stations neighboring to the main base station to receive the respective measuring signals. By reflecting the above-mentioned conditions in the initial values of transmit power and processing gains to be transmitted to the at least two base stations neighboring to the main base station, the at least two base stations can receive the respective measuring signals from the mobile station assuredly.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described below using accompanying drawings.

First Embodiment

Figure 1:
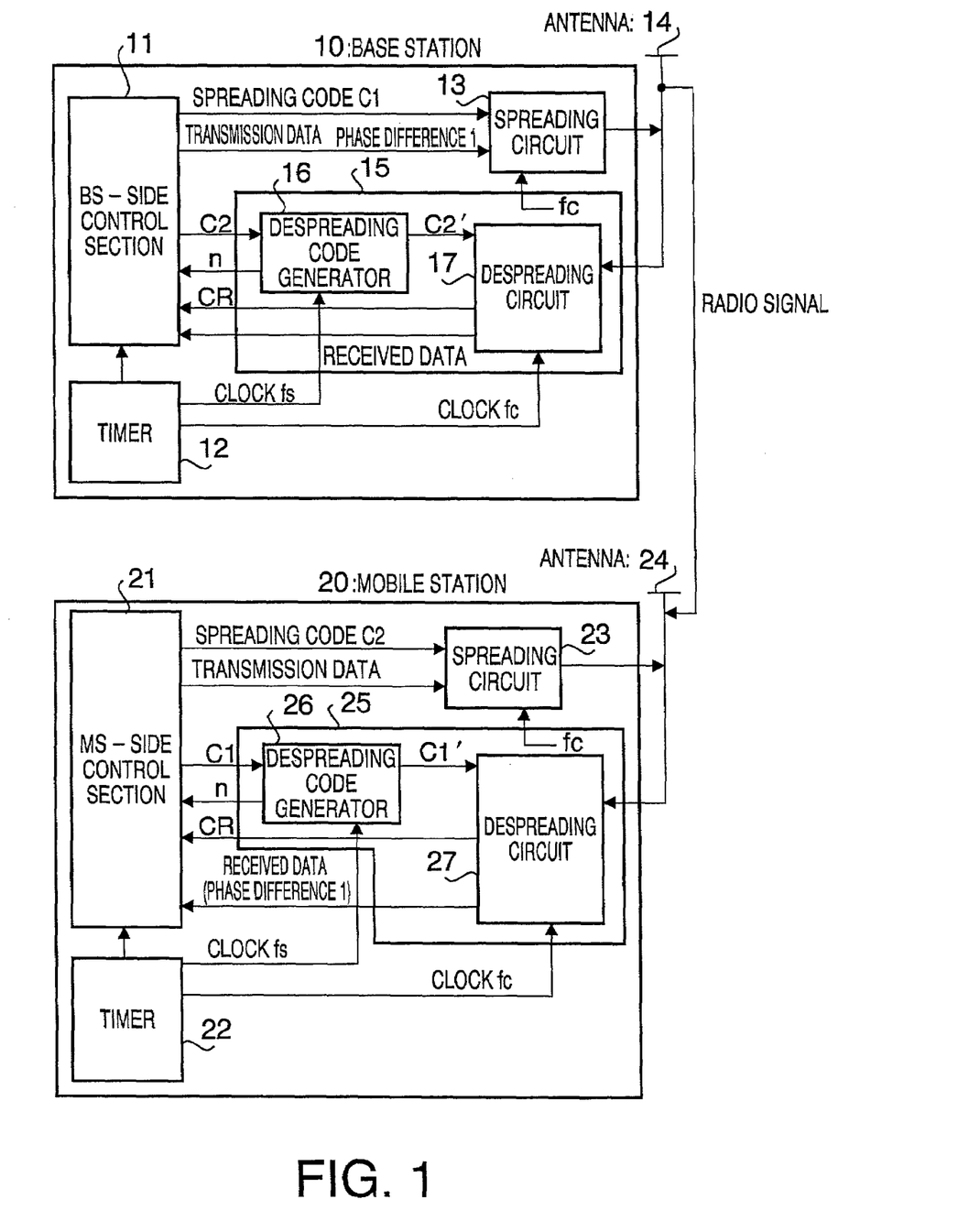
FIG. 1 illustrates functional block diagrams of a base station and mobile station capable of performing a radio communication in a CDMA system according to a first embodiment of the present invention.

FIG. 1 illustrates functional block diagrams of a base station and mobile station capable of performing a radio communication in a CDMA system that is one of spread spectrum communication systems according to the first embodiment of the present invention.

In FIG. 1, base station 10 is provided with base station side (hereinafter referred to as BS-side) control section 11 having calculation functions for communication control and distance measurement, timer 12 that generates a sampling rate fs (sampling duration Ts) and a chip rate fc (chip duration Tc), spreading circuit 13 that spreads transmission data, antenna 14 that transmits a spread signal while receiving a radio signal, and sliding correlator 15 that demodulates a received signal. BS-side control section 11 is comprised of, for example, a CPU, DSP and memory, and is provided with a phase difference detecting function, described later, in addition to original base station functions. Sliding correlator 15 is comprised of despreading code generator 16 that generates a despreading code by shifting a spreading code to detect the correlation of the received signal, and despreading circuit 17 that outputs a correlation value obtained by multiplying the received signal by the despreading code.

Meanwhile mobile station 20 is provided with functional blocks similar to those of base station 10 for the spread spectrum communication. In other words, mobile station 20 is provided with mobile station side (hereinafter referred to as MS-side) control section 21, timer 22, spreading circuit 23, antenna 24, and sliding correlator 25. MS-side control section 21 is comprised of, for example, the CPU, DSP, and memory, and is provided with the phase difference detecting function and a calculation function of detecting a distance between the base station 10 and the mobile station in addition to original mobile station functions. Sliding correlator 25 is comprised of despreading code generator 26 that generates a despreading code by shifting a spreading code to detect the correlation of the received signal, and despreading circuit 27 that outputs a correlation value obtained by multiplying the received signal by the despreading code.

The following explains operations of the base station and mobile station each configured as described above with reference to timing charts in FIGS. 2 and 3.

Figure 2:
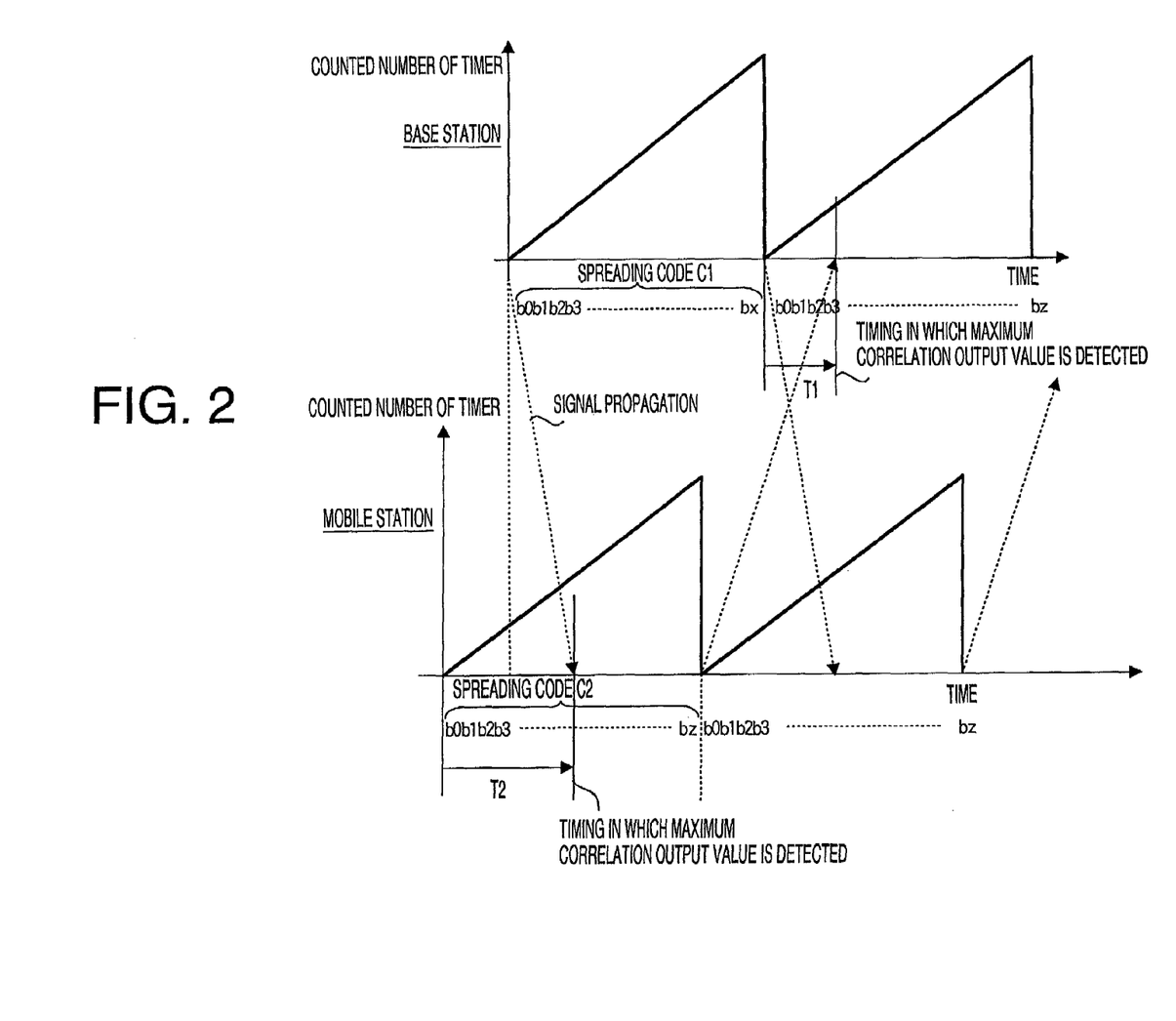
FIG. 2 illustrates timing charts in a spread spectrum communication between the base station and mobile station illustrated in FIG. 1.

FIG. 2 illustrates a situation in which base station 10 and mobile station 20 mutually perform spread spectrum communications based on respective reference timings provided form timers 12 and 22.

In base station 10, when BS-side control section 11 inputs transmission data to spreading circuit 13, spreading circuit 13 spreads the transmission data with a spreading code C1 using a predetermined chip rate fc at a transmission timing provided from timer 12, and the spread radio signal is transmitted from antenna 14. Each of timer 11 and 12 are performed in same period.

At this point, spreading circuit 13 multiplies the transmission data by the spreading code C1 according to a chip rate clock fc generated in timer 12. A reference timing of timer 12 provides a timing at which a head of the spreading code C1 should appear to spectrum spread the transmission data. Specifically the spreading code C1 is generated so that the head of the spreading code C1 is multiplied by the transmission data when a count value of the clock fc of timer 12 is 0. Further an end of the spreading code C1 is multiplied by the transmission data when the count value is a maximum value, and the head of the spreading code C1 appears when the count value is reset at a next clock, and then set to be 0 again.

Thus base station 10 transmits to mobile station 20 a radio signal (spectrum spread signal) with a periodicity generated based on a reference timing periodically provided from timer 12 internally provided in base station 10. The radio signal transmitted from base station 10 arrives at mobile station 20 a propagation time Td later after being transmitted. The Td is proportional to a distance between mobile station 20 and base station 10.

Meanwhile in mobile station 20, in the similar way to the base station 10, spreading circuit 23 spreads transmission data provided from MS-side control section 21 with a spreading code C2 based on a reference timing provided from timer 22 provided in the mobile station, and the spread radio signal is transmitted from antenna 24.

Thus mobile station 20 also transmits to base station 10 a radio signal (spectrum spread signal) with a periodicity generated based on the reference timing periodically provided from timer 22 internally provided in mobile station 20. When an lapsed time is small after the radio signal is transmitted from base station 10 to mobile station 20, the radio signal transmitted from mobile station 20 is passed through the same propagation path as the base station transmitted signal, and therefore the propagation time thereof is also the same, i.e., Td.

In mobile station 20, the radio signal is received at antenna 24, and the received signal is input to despreading circuit 27, while a despreading code C1' generated in despreading generator 26 is input to despreading circuit 27. The despreading code C1' is generated by sequentially shifting in despreading code generator 26 the spreading code C1 that is the same as the spreading code used in spreading in the transmission side. That is, as illustrated in FIG. 2, the spreading code C1 is set from a head at a timing (reference timing) a count value of timer 22 of the mobile station 20 is 0, and then shifted sequentially in a sampling duration Ts until the count value is indicative of a maximum value, and then reset. At this point, despreading circuit 27 outputs correlation outputs CR of a data sequence of the received signal with the despreading code C1' to MS-side control section 21. MS-side control section 21 detects a time when the largest correlation output CR is obtained. This correlation processing is called spreading pattern matching for despreading.

The time taken to obtain the maximum value of correlation output CR by the spreading pattern matching for despreading in mobile station is comprised of a timer difference time between the reference timing of timer 12 of base station 10 as the transmission side and the reference time of timer 22 of mobile station 20 as the reception side, and the propagation delay Td described above. The time taken to obtain the maximum value of correlation output CR from the reference timing, as a reference, provided from timer 22 of mobile station 20 is referred to as a phase difference T2 as a mobile station detected phase difference.

The phase difference T2 is obtained using the number "n" of shift times required to detect the maximum correlation output according to the following equation when a sampling rate fs is N (N is an integer more than or equal to 1) times a chip rate fc.

$$\text{Phase difference } T2 = n \times T s \qquad (1)$$

Further base station 10 performs the spreading pattern matching for despreading on a signal received from mobile station 20 based on the reference timing provided from timer 12 of base station 10, and thereby detects the time taken to obtain the maximum value of correlation output CR from the reference timing, as a reference, provided from timer 12 of base station 10, as a phase difference T1.

Figure 3:
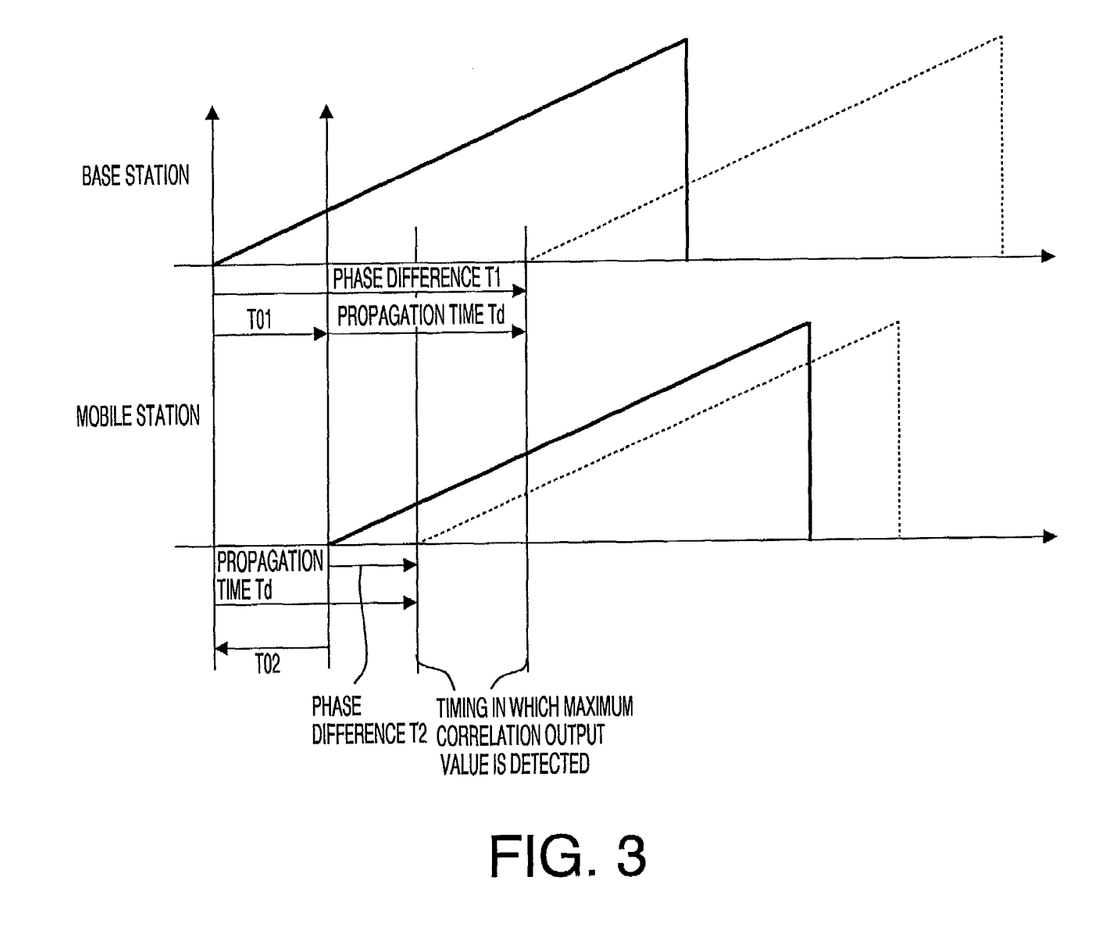
FIG. 3 illustrates timing charts to explain phase differences detected in the base station and mobile station.

FIG. 3 illustrates the phase differences T1 and T2 detected respectively at base station 10 and mobile station 20, propagation delay Td, and timer differences T01 and T02 that are time differences of the reference timings. As illustrated in FIG. 3, when synchronization is not acquired between communication stations (base station and mobile station), the phase difference Tn is expressed with the following equation when the timer difference at the transmission side is T0n using the reception side as a reference.

$$\text{Phase difference } Tn = \text{synchronization difference } T0n \text{ at the transmission side viewing from the reception side} + \text{propagation time } Td \qquad (2)$$

When it is assumed that T02 is a difference of timer 12 of base station 10 when mobile station 20 is a reference, T01 is a difference of timer 22 of mobile station 20 when base station 10 is a reference, the phase difference T2 is a phase difference when base station 10 is the transmission side and mobile station 20 is the reception side, and that phase difference T1 is a phase difference when mobile station 20 is the transmission side and base station 10 is the reception side, the relationship expressed with the following equation is obtained.

$$T02 + \text{propagation time } Td = \text{phase difference } T2 \qquad (3)$$

$$T01 + \text{propagation time } Td = \text{phase difference } T1 \qquad (4)$$

When timer 22 of mobile station 20 is ahead by T01 from base station 10 as the reference, timer 12 of base station 10 is inversely behind by T02 from mobile station 20 as the reference.

Accordingly there is a relationship of T01=−T02. Therefore adding the equations (3) and (4) cancels the timer differences at the left sides, and leaves only the propagation time Td at the left side of the resultant equation, and a distance "r" between base station 10 and mobile station 20 is calculated.

Propagation time $Td$=(phase difference $T1$+phase difference $T2$)/2        (5)

Distance "$r$"=velocity of light×(phase difference $T1$+phase difference $T2$)/2        (6)

Further subtraction between the equations (3) and (4) cancels propagation times Td of the left sides, and leaves only the timer difference at the left side of the resultant equation, and then a synchronization difference is calculated.

$T01$=(phase difference $T1$−phase difference $T2$)/2        (7)

$T02$=(phase difference $T2$−phase difference $T1$)/2        (8)

Correcting the calculated timer difference obtains the distance "r" with the following equation.

Distance "$r$"=velocity of light×(phase difference $T1$−timer difference $T01$)        (9)

Distance "$r$"=velocity of light×(phase difference $T1$−timer difference $T02$)        (10)

When mobile station 20 measures the distance between base station 10 and mobile station 20, base station 10 receiving a signal from mobile station 20 transmits the phase difference T01 detected based on the reference timing of timer 12 of base station 10 to mobile station 20 as transmission data.

Mobile station 20 demodulates received data concerning the phase difference T01 received from base station 10 to acquire the phase difference T01 detected in base station 10. Meanwhile mobile station 20 detects the phase difference T2 based on the reference timing of timer 22 of the station 20 by the spreading pattern matching for despreading of received data concerning the phase difference T01.

MS-side control section 21 calculates the distance "r" between mobile station 20 and base station 10 based on the above-mentioned equation (6). Further it may be possible to detect the timer difference T02 of base station 10 using mobile station 20 as the reference, or the timer difference T01 of mobile station 20 using base station 10 as the reference, according to the equation (7) or (8), and correct the timer difference to obtain the distance "r" based on the equation (9) or (10).

Moreover using the timer difference T01 or T02 calculated with the equation (7) or (8), timers 22 and 12 respectively of mobile station 20 and base station 10 are set to match each other. For example in base station 10, BS-side control section 11 corrects timer 12 by the timer difference T02 from mobile station 20 as the difference. It may be possible that mobile station 20 performs correction similar to the foregoing. However, since a base station communicates with a plurality of mobile stations simultaneously in the cellular communication system, it is convenient with a operation of system to match the timer of the mobile station with the timer of base station.

After the timer differences are canceled, it may be possible that a relative distance "r" is calculated with the following equation.

Distance "$r$"=$c$×phase difference        (11)

where c is a constant corresponding to the velocity of light.

Second Embodiment

In the spread spectrum system, signals each with the sampling rate fs (symbol duration Ts) are multiplexed usually on all channels using the same chip rate fc (duration Tc). Generally information amount Isr required for measuring a distance is sufficiently smaller than information amount Isi transmitted for a user information communication. Therefore it is possible to set a bit number Nr (=processing gain Gr) of a spreading code Cr to be multiplexed by a measuring signal R to be sufficiently greater than a bit number Ni (=processing gain Gi) of a spreading code Ci to be multiplexed by a signal I for the user information communication.

Figure 4:
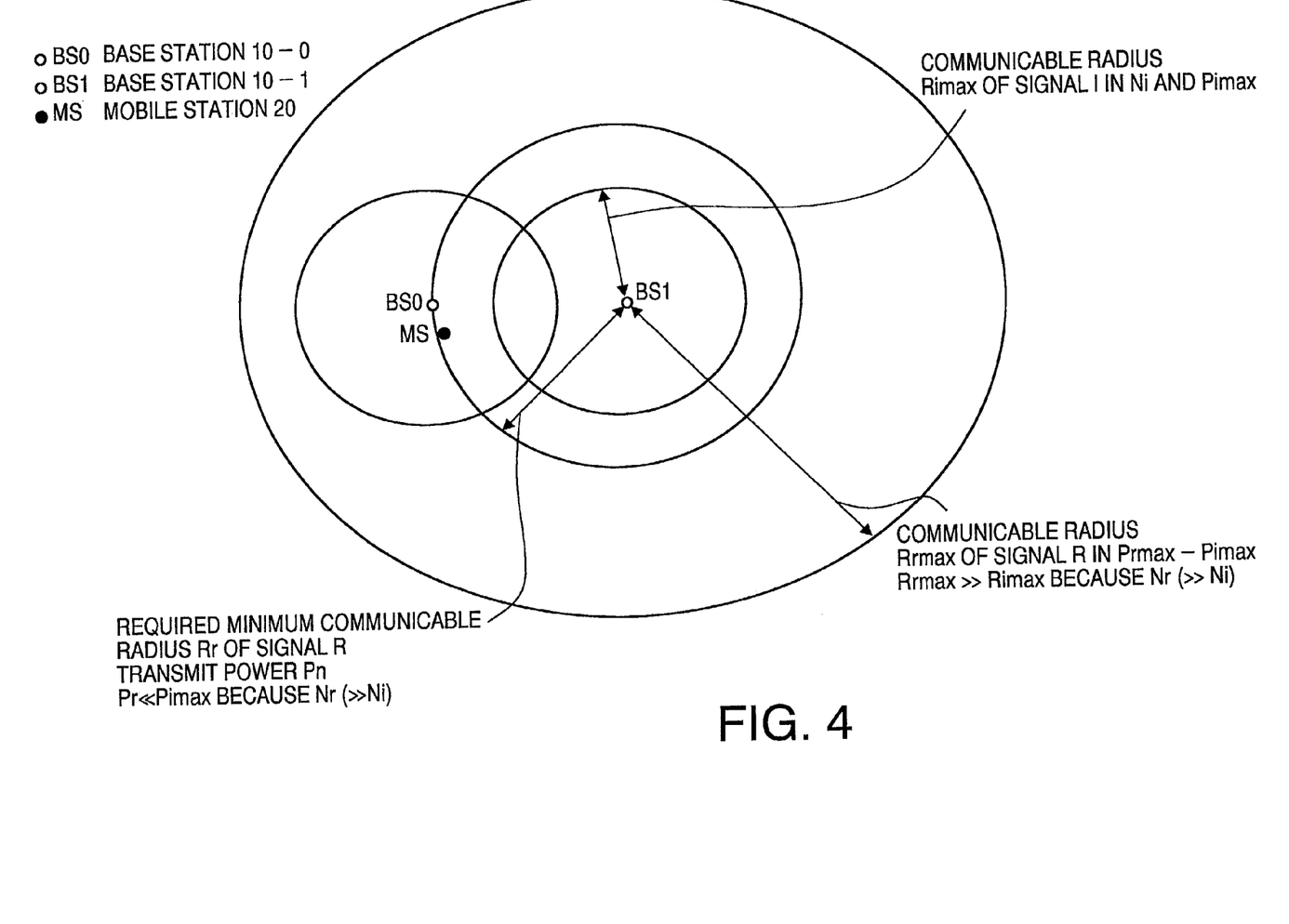
FIG. 4 is a diagram illustrating states of measuring signals to explain a second embodiment of the present invention.

The product G·P of the processing gain G and transmit power P is defined as actual transmit power PE. It is apparent that an upper limit of actual transmit power PEr (=Gr·Pr) of the measuring signal R can be set to be sufficiently greater than an upper limit of actual transmit power PEi (=Gi·Pi) of the signal I for the user information communication. As illustrated in FIG. 4, this condition means that with respect to base stations 10 and mobile station 20, a communicable radius Rrmax concerning the measuring signal R is sufficiently greater than a communicable radius Rimax concerning the signal I for the user information communication. Thereby, adjusting the transmit power Pr to cover the mobile station as a target of the position measurement enables the mobile station 20 to communicate with a plurality of base stations 10. At this point, the actual transmit power PEr is lager than the actual transmit power PEi, but processing gain Gr is lager than processing gain Gi in sufficiently (Gr>>Gi), so Pr<<Pimax is made. It is considered that interference approximately do not occur between the base stations 10. Accordingly the above descried problem is solved by executing the foregoing. The principle of the present invention is mainly as described above.

In addition the second embodiment describes the case that in the CDMA cellular mobile communication system, the information communication service is already implemented, and a position detecting service is further added.

Implemented as methods for a current position detecting service are a GPS system and AOA (Angle of Arrival). However adopting the GPS system results in introduction of another system other than the cellular mobile communication system. But it is necessary for mobile station 20 to be further provided with hardware that receives a GPS signal and position calculating device, resulting in a complicated hardware configuration of mobile station 20 and increased cost. Further adopting the AOA system means that an antenna of base station 10 is not achieved with only an omnidirectional stationary antenna, and that a directional rotating antenna needs to be installed, resulting in a complicated hardware configuration of base station 10 and increased cost.

Meanwhile adopting a measuring method according to the principle of trigonometrical measurement does not require introduction of another system other than the cellular mobile communication system, and therefore a current hardware configuration can be employed without being modified. In addition adopting a measuring method based on the principle of current trigonometrical measurement provides the problem as described previously, and therefore it is necessary to solve the problem.

Mobile station 20 usually registers a position thereof with base station 10 present closet thereto. It is therefore rational that base stations 10 each detecting a distance between mobile station 20 and the base station are comprised of a base station 10-0 with which the position is registered and base stations 10-$i$ ($i$=1 to 6) neighboring to the base station 10-0. The base station 10-0 with which the mobile station 20 communicates is defined as a main base station, and the base station 10-$i$ neighboring to the main base station 10-0 is defined as a sub base station.

Figure 5:
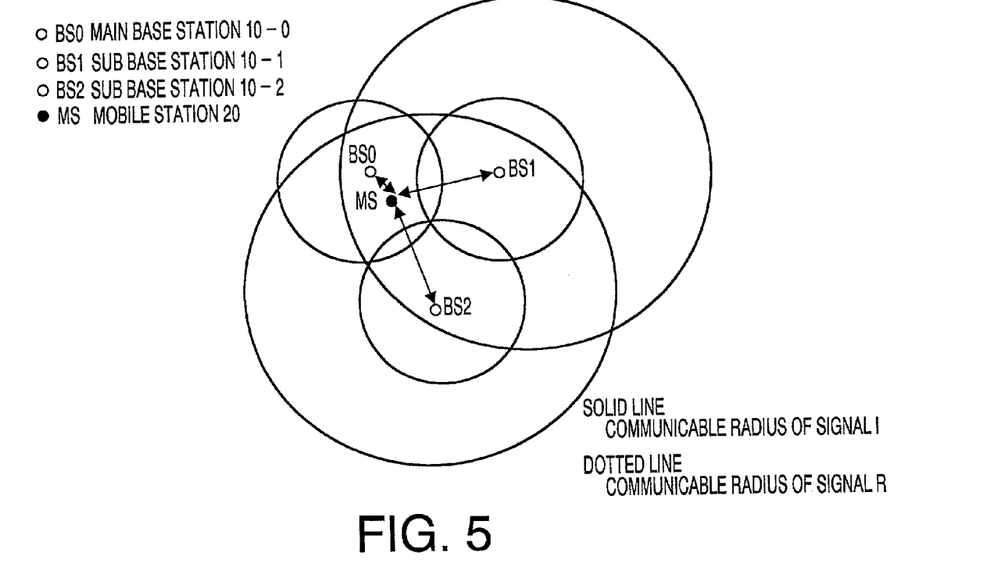
FIG. 5 is another diagram illustrating states of the measuring signals to explain the second embodiment of the present invention.

FIG. 5 illustrates the main base station 10-0 and two sub base stations 10-1 and 10-2 each detecting a position of the mobile station 20.

As described previously, an interference amount of the measuring signal R can be neglected approximately, however interference between the base stations due to the measuring signal R is not 0 strictly. It is desired that the interference of the measuring signal R is made as small as possible even if it can be neglected approximately. For that, it is preferable to increase the processing gain Gr (bit number Nr of the spreading code Cr to be multiplied by the measuring signal R), however increasing a load on the hardware of system. In other words there is a trade-off relationship between both. The following explains a method of determining the processing gain Gr.

Herein it is assumed that base stations 10 provide respective measuring channels R to mobile station 20 to detects the position of mobile station 20.

To simplify the explanation, it is assumed that in the cellular mobile communication system implemented as described previously, communications are performed with only direct signals with obstacles for the communications neglected, and base stations 10 are arranged in an ideal arrangement. That is, an area is covered with hexagonal communication cells, and the base stations 10 are each positioned at the center of the hexagonal. Distances D between neighboring base stations are constant.

P: transmit power of a desired signal transmitted from a transmitter;

P($r$): transmit power of the desired signal at a point away from the transmitter by a distance "$r$";

G(=N): processing gain (=bit number of a spreading code);

PE(=G·P): actual transmit power of the desired signal transmitted from the transmitter;

"$r$": distance;

Ps($r$): received power of a despread desired signal at the point away from the transmitter by the distance "$r$"

Pn: received power of a despread interference signal;

fd($r$)=P($r$)/P: function indicative of attenuation of transmit power of a signal with the distance "$r$" as a variable;

D: distance between neighboring base stations; and r0: a distance between the main base station and mobile station.

Communication quality Q is defined as a ratio Ps/Pn of the received power of the despread desired signal Ps to the received power of the despread interference signal Pn (so-called S/N ratio). While the communication quality Q includes many types with the definitions, the communication quality Q have relation to the S/N ratio with monotonously increase, and therefore essentially the same.

The relationship between Ps and an arrival distance "$r$" of the desired signal is expressed with the following equation (12).

$$Ps(r) = G \cdot P \cdot fd(r) \tag{12}$$

The product G·P of the processing gain G and transmit power P is defined as the actual transmit power PE.

$$Ps(r) = PE \cdot fd(r) \tag{13}$$

Conditions to receive the desired signal with a communication quality more than or equal to a predetermined communication quality Q1 at a position away from a communication station by the distance "$r$" are expressed with the following equations (14) and (15).

$$Ps(r)/Pn \geq Q1 \tag{14}$$

$$PE \geq Q1 \cdot Pn/fd(r) \tag{15}$$

The condition is expressed with the following equation (19) that when a desired signal transmitted from a position away by a distance r1 with the actual transmit power PEA can be received with the quality Q1, a desired signal transmitted from a position away by a distance r2 is received with the quality Q1.

$$PE1 = Q1 \cdot Pn/fd(r1) \tag{16}$$

$$PE2 \geq Q1 \cdot Pn/fd(r2) \tag{17}$$

$$PE2/PE1 \geq fd(r1)/fd(r2) \tag{18}$$

$$PE2 \geq PE1 \cdot fd(r1)/fd(r2) \tag{19}$$

Since the main base station 10-0 is a base station with which the mobile station registers the position thereof, the station 10-0 is communicable with the mobile station 20. Accordingly it is possible to obtain a distance r0 between the base station 10-0 and mobile station 20. Further at this point, the actual transmit power PEr0 and PEr0' is known, with which measuring signals R are transmitted from the base station 10-0 and mobile station 20, respectively. At least two among the sub base stations 10-$i$ ($i$=1 to 6) neighboring to the main base station 10-0 are present in a circle with a radius of the distance D between the base station 10-0 and the base station 10-$i$, and the mobile station 20 is positioned in a center of that circle. Accordingly when the sub base stations 10-$i$ transmit respective measuring signals R with the actual transmit power PE obtained with the equation (20), the mobile station is capable of receiving the measuring signals R from at least two base stations 10-$i$.

$$PE = PE0 \cdot fd(R0)/fd(D) \tag{20}$$

The actual transmit power of the measuring signal R transmitted from the mobile station 20 to the sub base station 10-$i$ is also obtained similarly. Distances Di between neighboring base stations are constant in the ideal cellular mobile communication system, but not constant actually. However it may be possible to use a maximum distance Dmax among respective distances Di between the main base station 10-0 and neighboring six sub base stations 10-$i$ ($i$=1 to 6).

As the mobile station 10 moves away from the base station 10, the reception side may not receive a signal with a communication quality more than or equal to the predetermined communication quality Q1, in spite of the transmission side transmitting the signal with transmit power of the upper limit Pmax. In this case, it may be possible to increase the processing gain G (=spreading code bit number N) to increase the communication quality to be more than or equal to the communication quality Q1.

The relationship between the processing gain G, and the chip rate fc and symbol rate fs is shown with the following equation (21).

$$G = fc/fs \tag{21}$$

In order to increase the processing gain G, the chip rate fc is increased, or the symbol rate fs is decreased. The current cellular mobile communication systems include a system in which communications are performed with the chip rate fc fixed and with a plurality of different symbol rates fs coexisting. Therefore it is easy to achieve decreased symbol rate fs with the chip rate fc fixed. In addition in the current cellular mobile communication system, once the symbol rate fs is determined for each communication, thereafter the communication is continued with the same symbol rate. Further the symbol rate fs is not changed even if the predetermined communication quality is not satisfied while transmission is performed with the transmit power of the upper limit.

The following equation (22) shows the relationship between the symbol rate fs, a communication period Tf of a signal and an information amount Is indicative of the number of symbols of the signal.

$$fs \geq Is/Tf \tag{22}$$

In order to decrease the symbol rate fs, the information amount Is is decreased, or the communication period Tf is increased.

It is rational to communicate initially using the information amount Is of a required minimum level, and then increase the communication period Tf when necessary.

Third Embodiment

The above-mentioned second embodiment assumes the case that base station 10 provides respective measuring channels R for mobile stations 20 separately for each mobile station to detect respective distances. However when the number of mobile stations 20 as targets of position measurement is large, the number of measuring channels R is increased, and consequently radio resource to be used and processing capabilities of the base station 10 are increased. Therefore this embodiment assumes a case that the base station 10 transmits the measuring signals R to a plurality of mobile stations 20 on a broadcast channel.

The broadcast channel is a common channel for base station 10 to broadcast common information to all the mobile stations 20 present in a cell of the base station. In the current cellular portable telephone system, the broadcast channel called perch channel is implemented to broadcast information for use in registering a position of a portable telephone. In addition registering a position is different from the position detecting.

When reference timers of base station 10 and mobile station 20 are matched, mobile station 20 is capable of obtaining a distance "r" between the base station 10 and mobile station 20 by measuring a received timing of the measuring signal R to detect a phase difference Tm, based on the previously mentioned equation (11). In addition the timer matching is performed based on the previously mentioned equations (7) and (8).

The measuring signal R should be received at the mobile station 20 present closest to the neighboring base station 10, however being not ensured by the perch channel P previously mentioned. Therefore a measuring broadcast channel R is set to be a channel R different from the perch channel P, and the actual transmit power PEr of the channel R is increased to be larger than the actual transmit power PEp of the perch channel P.

Figure 6:
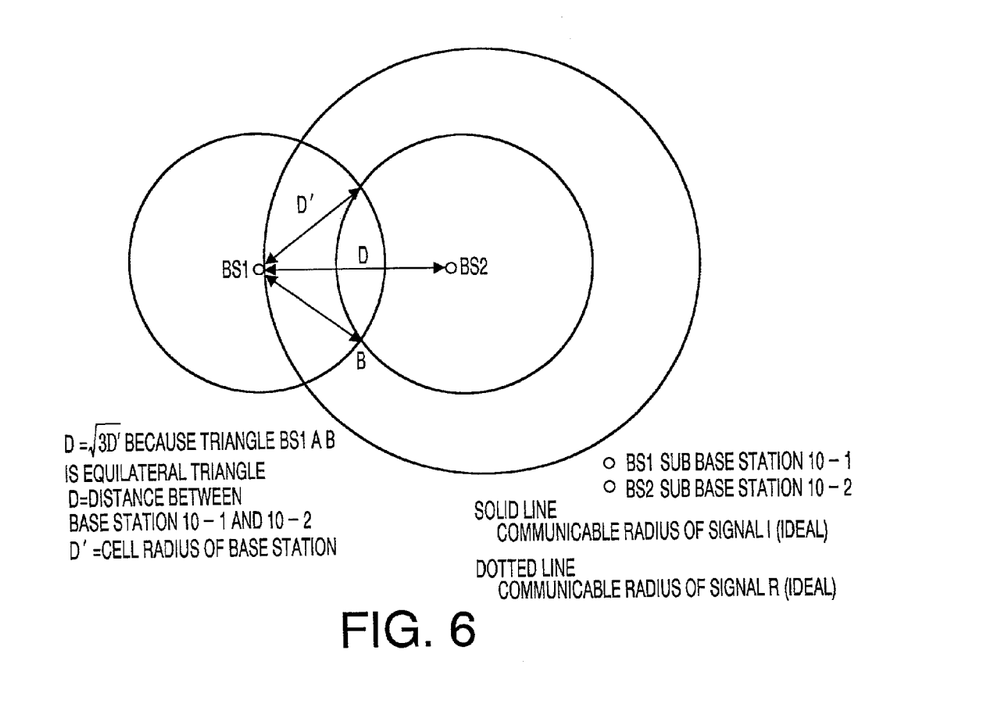
FIG. 6 is a diagram illustrating states of the measuring signals to explain a third embodiment of the present invention.

A base station in the cellular portable telephone system is positioned at a center of a hexagonal, and it is ensured that a signal P of the perch channel can be received within a circumscribed circle (with a radius of D') of the hexagonal. The relationship between the previously mentioned D and D' is shown with the following equation (23) apparently from FIG. 6.

$$D'=\text{length of a side of an equilateral triangle} \tag{23}$$

$$D=\text{length of an altitude from the vertex to the base of the equilateral triangle} \times 2 \tag{24}$$

$$D=(3)^{1/2} \cdot D' \tag{25}$$

Since power of a radio signal attenuates in proportion to a distance to the negative second power, received power P(D) of a desired signal before being despread at a position of the distance D is ⅓ times the received power P(D') of a desired signal before being despread at a position of the distance D'. Accordingly when the product of the processing gain Gr and transmit power Pr of the measuring signal R, i.e., the actual transmit power PEr is set to be more than or equal to 3 times the actual transmit power PEp of the signal P, the received power Gr·Pr(D) of the despread measuring signal R at the point of distance D is more than or equal to received power Gp·Pp(D') of the despread signal P of the perch channel P at the position of the distance D', thereby ensuring that the mobile station 20 is capable of receiving the measuring signal R.

$$Gr \cdot Pr \geq 3 \cdot Gp \cdot Pp \tag{26}$$

When Pr=Pp, $$Gr \geq 3 \cdot Gp \tag{27}$$

Fourth Embodiment

The following explains about an error in distance measurement as an assumption of position measurement, and whether the present invention is achievable in a current radio communication specification.

When an electromagnetic wave is communicated between a measuring device and a target of position measurement, a distance is calculated by measuring a propagation time T of one way of the electromagnetic wave, and multiplying the propagation time T by a propagation velocity of the electromagnetic wave (velocity of light= 3.0×10⁸ m). At this point, a distance dx calculated by multiplying a time resolution dT in measuring the propagation time T by the velocity of light is a distance resolution in the distance measurement. Inversely dT calculated by dividing an allowable error dx in the distance by the velocity of light is an allowable value in the time resolution.

As examples, position detecting systems such as a locator and navigator are achieved in the cellular mobile communication system. For example, the present invention is applicable to emergency services, and stray child search. In addition in the USA, portable telephone companies are responsible for detecting positions of subscriber's mobile stations at predetermined accuracy and probability.

Assuming that the accuracy required for detecting a position (distance) of a cellular portable telephone is of the order of 60m, the distance resolution of 60m is converted into the time resolution of 200 nsec. When it is assumed that mobile station 20 as a target of position measurement is mounted on an automobile moving at a velocity of 100 km/h, the time required for the automobile to move 60m is about 2.2 sec. This value is about 10⁷ times the required time resolution of 200 nsec, enabling a static condition to be considered.

In the spread spectrum communication system, the time resolution in measuring the signal propagation time is a sampling duration in acquiring chip synchronization, and 200 nsec are converted into a chip frequency of 5 MHz. In the IS95 implemented as the current cellular mobile communication system, the chip rate is about 1.2 MHz. Therefore oversampling 4 times the chip rate achieves the above-mentioned time resolution in its order. In other words, it is possible to achieve both communications and distance measurement in the radio specification with the order equal to that in the IS95 spread spectrum communication system.

Figure 7:
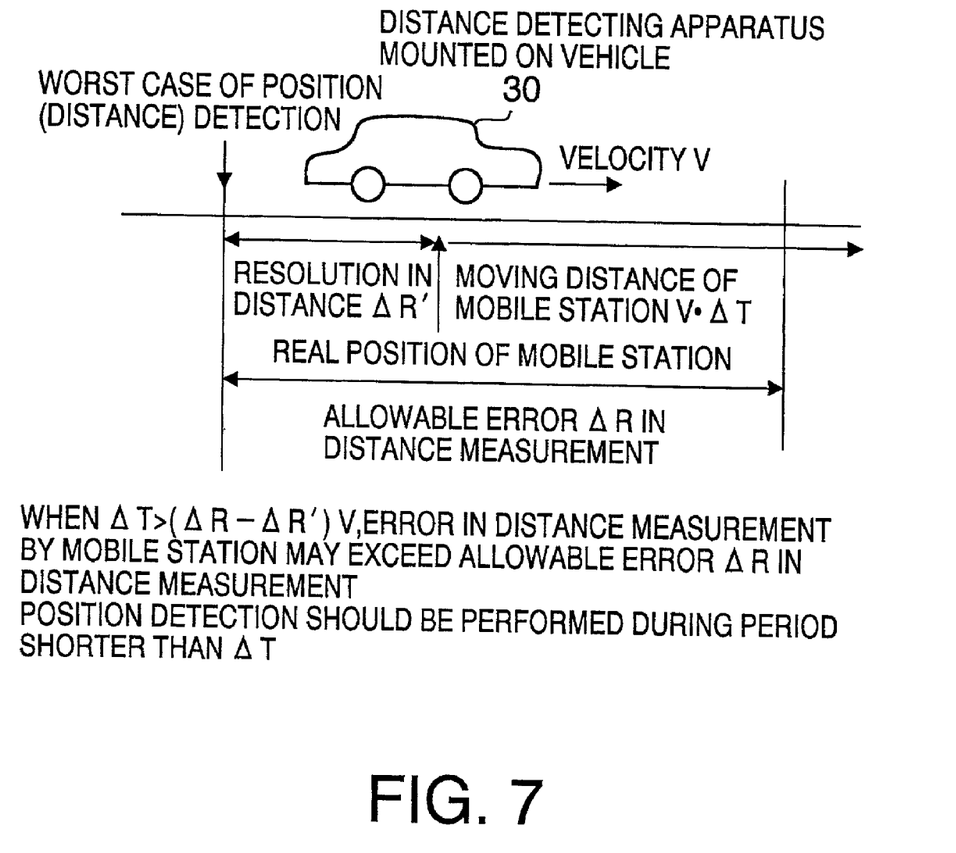
FIG. 7 is a diagram illustrating a relationship between a velocity of a mobile station and a communication period for the measuring signal to explain a fourth embodiment of the present invention.

For example it is possible to achieve chip rate about twice easily with a current technique. In this case, the time resolution converted from the allowable error in distance measurement is 100 nsec. 100 nsec are converted into 30m in distance. It takes about 1.1 sec for an automobile with a velocity per hour of 100 km/h to move 30m. Accordingly as illustrated in FIG. 7, when the two stations performs communication by signal R in a duration more than or equal to about 1.1 sec, there is a possibility that automobile 30 with mobile station 20 mounted thereon as an target of the position measurement moves out of a range of the allowable error. On the other hand, when the two stations performs communication by signal R in duration less than 1.1 sec, it is ensured that automobile 30 with mobile station 20 mounted thereon as the target of the position measurement stays in the range of the allowable error ΔR.

Thus it is rational to determine a communication period of the measuring signal R corresponding to a velocity V of mobile station 20. In addition it may be possible to replace the velocity with a maximum velocity Vmax or Vmax', which is a sum of the Vmax and a predetermined margin, expected in mobile station 20. Further it may be possible that mobile station 20 is provided with a velocity V detecting device, and that a velocity detecting device already provided in automobile 30 notifies mobile station 20 of the velocity V. Furthermore it may be possible that mobile station 20 is provided with a maximum velocity selecting button (for example, "walk", "automobile", and "train") so that a user of the mobile station 20 presses the button to select a predicted value or estimated value of an upper limit of a velocity, without providing the mobile station 20 with the velocity detecting device. The mobile station 20 obtains an upper limit of the communication period of the measuring signal R based on velocity information V of the station 20, and within the upper limit, determines a communication period Tfr appropriate for the station 20 to notify a network. It is preferable that the communication period Tfr is longer when reduction of interference due to the measuring signal R is only considered. It is herein assumed that the communication period Tfr is 1 sec to simplify the explanation.

An information amount required for measuring the distance is generally sufficiently small as compared to ordinary information communications. In particular, after the reference timers are matched with the previously mentioned equations (7) and (8), any information is not required to measure the distance, and it is enough for mobile station 20 to transmit identification information. Further in the spread spectrum communication system, detecting the correlation output while despreading with a specified spreading code is equivalent to that the mobile station 20 transmits the identification information, whereby even the identification information is not required. When the identification information is transmitted as conformation on the assumption that the information amount is about 100 bits taking redundancy into consideration, a transmission rate of the measuring signal R is about 0.1 kbps. In contrast to this, the transmission rate of the information communicating signal in the IS-95 is about 14 kbps. Therefore the processing gain Gr of the measuring signal R is about 140 times the processing gain in the current IS-95. This value is larger sufficiently than 3 times that is calculated with the equation (27) previously described. Accordingly it is possible to achieve the present invention in the radio specification with the order almost equal to that in the radio specification in the cellular mobile communication system currently implemented.

Mobile station 20 determines a symbol rate fsr appropriate for the station 20 within the condition satisfying the following equation to notify base station 10 via the network.

$$fsr \geq Isr/Tfr \quad (28)$$

where fsr is the symbol rate of the measuring signal R, and Isr is an information amount indicative of the number of symbols of the measuring signal R.

The relationship between the processing gain Gr and symbol rate fsr is as follows, whereby determining the symbol rate fsr is equivalent to determining the processing gain Gr:

$$Gr = fc/fsr \quad (29)$$

When reducing an interference amount due to the measuring signal R is only considered, the greater processing gain Gr (in proportion to the symbol duration Tsr) is preferable because the transmit power is decreased corresponding to the increment. However it is not possible to set the spreading code length Nr to be greater than the bit number of a spreading code achievable in transmission/reception means in a communication apparatus, meaning "appropriate for the station 20" as described previously.

When the symbol rate fsr is determined to be a value greater than Isr/Tfr, time Troff shown with the following equation (31) is left. Canceling the measuring signal R during this left period reduces the interference amount, and further reduces power consumption.

$$Tsr = 1/fsr \quad (30)$$

$$Troff = Tfr - Isr \cdot Tsr \quad (31)$$

In addition when the symbol rate fsr is Isr/Tfr, Troff is 0. In this case the measuring signal R is always transmitted.

Fifth Embodiment

It is possible to achieve a distance detecting apparatus which executes the distance measuring method as described above by writing the communication method explained in the second embodiment and a program to execute the distance measuring method explained in the fourth embodiment in memories in control sections 11 and 21 respectively of base station 10 and mobile station 20. In other words it is possible to achieve the distance detecting apparatus without changing hardware configurations of preexisting spread spectrum communication apparatuses. Examples of the memories are a semiconductor memory, magnetic storage medium, optical storage medium and optomagnetic storage medium.

Further by providing the distance detecting apparatus in a mobile station and base station in the position detecting system, the position detecting apparatus is realized.

Furthermore mounting the distance detecting apparatus on an automobile achieves a car navigator and car locator.

Sixth Embodiment

The sixth embodiment describes about a velocity detecting apparatus which performs position detection a plurality of times based on a position detecting method as described above between a vehicle with a vehicle device provided with a distance measuring apparatus as described above and a plurality of base stations 10, and based on a moving distance converted from a difference between detected positions and a time difference of a timing of position detection, detects a velocity of the vehicle.

$$\text{Velocity } V^2=\{(x2-x1)^2+(y2-y1)^2+(z2-z1)^2\}/(t2-t1)^2 \quad (32)$$

In addition (x1, y1, z1) is a coordinate of a position detected at time t1, and (x2, y2, z2) is a coordinate of another position detected at time t2.

According to the sixth embodiment, it is possible to detect a velocity using detected positions.

In addition the present invention is not limited to the above-mentioned embodiments, and includes any modification and rearrangement without departing from the spirit and scope thereof. For example, it is assumed in the embodiments of the present invention that the arrangement of the base stations in the current user information communication system is ideal to simplify the explanation, however obviously the actual arrangement is not ideal. Therefore it is necessary to add predetermined margins to equations and numerical values explained in the embodiments of the present invention. Consequently the present invention includes remainders of safety factors for the foregoing, and the equations and numerical values corrected according to offset.

As described above, according to the present invention, attention is drawn to the fact that an information amount required for a measuring signal is generally small sufficiently than an information amount required for information communications, a required minimum symbol rate is obtained from a velocity of a mobile station, and a sufficiently great spreading code bit length (processing gain) is obtained by employing a sufficiently long symbol duration (spreading code period) for the measuring signal, whereby it is possible to obtain both an increased communicable distance of the measuring signal and a reduced interference amount. Therefore it is possible to detect a position of a mobile station in a base station arrangement providing the efficient use of radio resource for the information communications in the cellular mobile communication.

The present invention is not limited to the above described embodiments, and various variations and modifications may be possible without departing from the scope of the present invention.

This application is based on the Japanese Patent Application No. HEI11-243169 filed on Aug. 30, 1999, entire content of which is expressly incorporated by reference herein.

What is claimed is:

1. A method for detecting a position of a mobile station in a system using at least three base stations comprising measuring distances between the mobile station and the three base stations and detecting the position of the mobile station based on the measured distances, wherein the measurement of the distance between the mobile station and each base station comprises:

transmitting a first periodical signal from the base station using a broadcast channel, the first periodical signal having a periodicity synchronous with a first reference timing generated by a reference timer of the base station;

transmitting a second periodical signal from the mobile station, the second periodical signal having a periodicity synchronous with a second reference timing generated by a reference timer of the mobile station;

receiving the first periodical signal from the base station at the mobile station and obtaining a phase difference, at the mobile station, based on the second reference timing, the phase difference comprising a time interval between the second reference timing and a reception timing of said second periodical signal at the mobile station;

receiving the second periodical signal from the mobile station at the base station and obtaining a phase difference, at the base station, based on the first reference timing, the phase difference comprising a time interval between the first reference timing and a reception timing of said first periodical signal at the base station;

detecting a reference timing difference between the mobile station and the base station based on the phase differences at the mobile station and the base station;

matching the reference timer of the mobile station with the reference timer of the base station based on the reference timing difference; and obtaining a distance between the mobile station and the base station based on the phase differences.

2. The method according to claim 1, wherein the measurement of the distance between the mobile station and each base station further comprises:

transmitting a measuring signal between the mobile station and the base station and detecting the distance between the mobile station and the base station based on a propagation time of the measuring signal; and determining a communication period of the measuring signal based on an allowable error in measuring the distance, a distance resolution in measuring the distance, and relative velocity information between the mobile station and the base station.

3. The method according to claim 2, wherein the measurement of the distance between the mobile station and each base station further comprises determining the communication period of the measuring signal in the mobile station and reporting said communication period to the base station.

4. The method according to claim 3, wherein the measurement of the distance between the mobile station and each base station further comprises:

determining a symbol rate of the measuring signal based on the communication period of said measuring signal and an information amount required in measuring the distance;

obtaining an intermittent time of the measuring signal based on the symbol rate, the communication period and the information amount; and turning off transmission power during the intermittent time for each communication of the measuring signal.

5. The method according to claim 4, wherein the measurement of the distance between the mobile station and each base station further comprises determining the communication period and the symbol rate in the mobile station and reporting said communication period and symbol rate to the base station.

6. A position detecting apparatus provided in a mobile station to detect a position of the mobile station in a system using at least three base stations by measuring distances between the mobile station and the three base stations and detecting the position of the mobile station based on the measured distances, said position detecting apparatus measuring the distance between the mobile station and each base station, said position detecting apparatus comprising:

a receiver that receives a first periodical signal transmitted from the base station using a broadcast channel, and obtains a mobile side phase difference based on a mobile side reference timing generated by a mobile side reference timer of the apparatus, said first periodical signal having a periodicity synchronous with a base station side reference timing generated by a base station side reference timer, and the mobile side phase difference comprising a time interval between the mobile side reference timing and a reception timing of the first periodical signal;

a transmitter that transmits a second periodical signal to the base station, said second periodical signal having a periodicity synchronous with the mobile side reference timing;

a matcher that matches the mobile side reference timer with the base station side reference timer based on a reference timing difference between the mobile side phase difference and a base station side phase difference detected in the base station upon reception of the first periodical signal based on the base station side reference timing, said base station side phase difference comprising a time interval between the base station side reference timing and a reception timing of the first periodical signal; and an obtainer that obtains a distance between the mobile station and the base station based on the phase differences, wherein a measuring signal is transmitted between the mobile station and the base station and the distance between the mobile station and the base station is measured based on a propagation time of the measuring signal, and wherein a communication period of the measuring signal is determined based on an allowable error in measuring the distance, a distance resolution in measuring the distance, and relative velocity information between the mobile station and the bass station.

7. An apparatus to be mounted on a vehicle, said apparatus being provided with a distance detecting apparatus for detecting a position of the vehicle in a system using at least three base stations by measuring distances between the vehicle and the three base stations and detecting the position of the vehicle based on the measured distances, said position detecting apparatus measuring the distance between the vehicle and each base station, said apparatus comprising:

a receiver that receives a first periodical signal transmitted from a base station using a broadcast channel, and obtains a vehicle side phase difference based on a vehicle side reference timing generated by a vehicle side reference timer of the apparatus, said first periodical signal having a periodicity synchronous with a base station side reference timing generated by a base station side reference timer, and the vehicle side phase difference comprising a time interval between the vehicle side reference timing and a reception timing of the first periodical signal;

a transmitter that transmits a second periodical signal to the base station, said second periodical signal having a periodicity synchronous with the vehicle side reference timing;

a matcher that matches the vehicle side reference timer with the base station side reference timer based on a reference timing difference between the vehicle side phase difference and a base station side phase difference detected in the base station upon reception of the first periodical signal based on the base station side reference timing, said base station side phase difference comprising a time interval between the base station side reference timing and a reception timing of the first periodical signal; and an obtainer that obtains a distance between the vehicle and the base station based on the phase differences, wherein a measuring signal is transmitted between the vehicle and the base station and the distance between the vehicle and the base station is measured based on a propagation time of the measuring signal, and a communication period of the measuring signal is determined based on an allowable error in measuring the distance, a distance resolution in measuring the distance, and relative velocity information between the vehicle and the base station.

* * * * *